C. E. PATTON.
DEVICE FOR TRANSMISSION OF POWER BY FRICTION.
APPLICATION FILED FEB. 8, 1910.
978,778.
Patented Dec. 13, 1910.
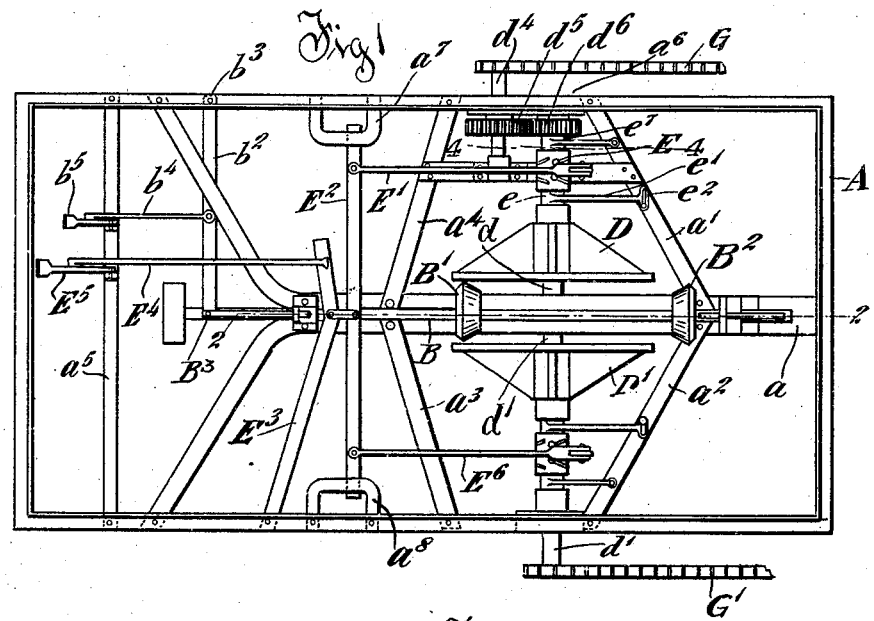
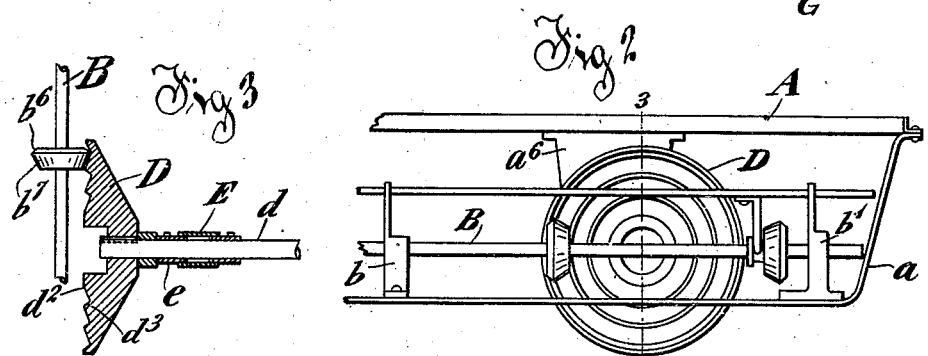
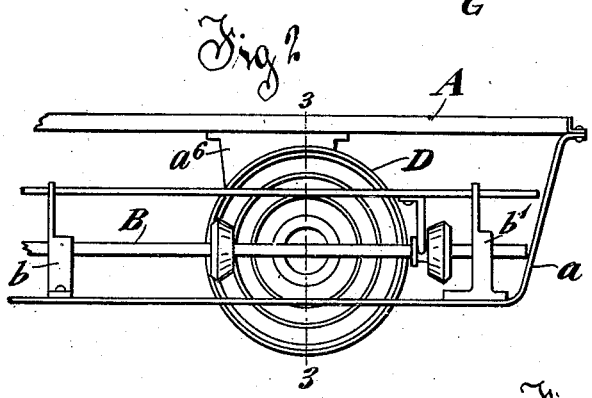
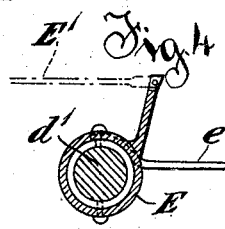
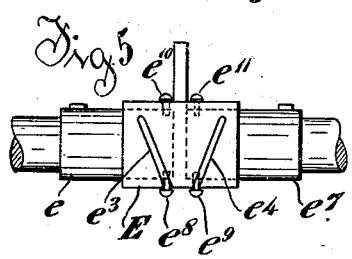
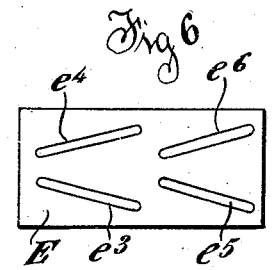
Witnesses
Inventor
Clarence E. Patton
By Walker F. Murray
Attorney

UNITED STATES PATENT OFFICE.

CLARENCE E. PATTON, OF CINCINNATI, OHIO.

DEVICE FOR TRANSMISSION OF POWER BY FRICTION.

978,778. Specification of Letters Patent. Patented Dec. 13, 1910.

Application filed February 8, 1910. Serial No. 542,729.

*To all whom it may concern:*

Be it known that I, CLARENCE E. PATTON, a citizen of the United States of America, and resident of Cincinnati, county of Hamilton, State of Ohio, have invented certain new and useful Improvements in Devices for Transmission of Power by Friction, of which the following is a specification.

The object of my invention is a means of transmitting power, variably by friction, wherein loss by slipping between the contacting devices is reduced to a minimum, the changes of speed are simply effected, and the shafts of the driven disks are mounted so as to counteract torsion which is due to the pressure between the driving pinions and the driven disks. This object is accomplished by the means described in the specification, and illustrated in the accompanying drawings, in which, Figure 1 is a plan view of a transmission device embodying my invention, of the frame in which it is mounted, and of the regulating levers. Fig. 2 is a partial sectional view, taken upon lines 2—2 of Fig. 1. Fig. 3 is a sectional view taken upon lines 3—3 of Fig. 2. Fig. 4 is a sectional view taken upon lines 4—4 of Fig. 1, upon a somewhat enlarged scale. Fig. 5 is a side elevation of the means of reciprocating the driven disks toward and away from the driving pinions. Fig. 6 is a diagrammatical view of the sleeve, the rotation of which effects the movement of the parts shown in Fig. 5.

Referring to the parts: In Fig. 1, A, indicates the frame of an automobile, upon which the parts are thus mounted. Upon the frame, A, a longitudinal beam, $a$, is mounted. From the beam, $a$, brace rods, $a'$, $a^2$, $a^3$ and $a^4$, extend to the frame, A. Upon the beam, vertical brackets, $b$, $b'$, are secured, in which the driving shaft, B, is journaled. Shaft, B, is splined to the shaft of the motor, (not shown) in a manner such that the shaft, B, is capable of receiving a reciprocating motion. To impart the reciprocating motion to shaft, B, it is pivoted at $B^3$ to a lever, $b^2$, which in turn is pivoted at, $b^3$, to the frame, A, and is coupled by means of a link, $b^4$, to a foot lever, $b^5$, mounted upon a cross rod, $a^5$, of the frame, A. Upon the shaft, B, driving pinions, B', B², are secured. The periphery of each driving pinion is beveled in a manner such that one face, $b^6$, is short, and the other face, $b^7$, is long, so that the beveled faces present in side elevation the letter L. Opposed driven disks, D, D', are splined upon transverse shafts, $d$, $d'$, which are journaled in brackets, $a^6$, which project downward from the frame, A. Each of the disks, D, D', has in its face a series of concentric L-shaped grooves, which are adapted to engage the driving pinions, B, B'. These grooves, like the peripheries of the driving pinions, each have a long face, $d^2$, and a short face, $d^3$. The long faces, $d^2$, of the opposing disks, D, D', are in planes which converge toward the imaginary point formed by the intersection of the line which joins the axes, $d$, $d'$, and the axis of shaft, B. The faces, $b^6$, of the driving pinions, are made at a more acute angle to the face, $b^7$, than is the face, $d^3$, of the groove to the face, $d^2$, so that the face, $b^7$, of the driving pinions contacts the face, $d^2$, of the grooves, but the face, $b^6$, of the driving pinion contacts the face, $d^3$, only at the meeting points of the faces, $d^2$, $d^3$. The result of this construction is that there is no loss by slipping, between the contact faces, $b^7$, and $d^2$.

To effect the movement of the driven disks toward and from the driving pinions, the following construction is used. Adjacent to the disk, D, a collar, $e$, is placed upon the shaft, $d$, so as to be capable of reciprocation thereon. Collar, $e$, is supported by a rod, $e'$, which has a slotted foot, $e^2$, to reciprocate upon the brace strap, $a'$. Adjacent to collar, $e$, a sleeve, E, is mounted upon the shaft, $d$. Sleeve, E, has in it two sets of converging grooves, $e^3$, $e^4$ and $e^5$, $e^6$. Adjacent to sleeve, E, a collar, $e^7$, is fixed upon the shaft, $d$. Both collars, $e$, and $e^7$, have pins, $e^8$, $e^9$, and $e^{10}$, $e^{11}$ secured to them, and projecting into the slots, $e^3$, $e^4$, and $e^5$, $e^6$. Sleeve, E, may be rotated upon the shaft, $d$, by means of a link, E', a cross rod, E², which is mounted to slide in brackets, $a^7$, $a^8$ upon the frame, A, and a lever, E³, which is pivoted to the frame, A, and secured by a link, E⁴, to an actuating lever, E⁵.

The construction of the parts for actuating the disk, D', is similar to that just described for actuating the disk, D, and therefore, further description is not required, except to say that the link, E⁶, which corresponds to the link, E', is likewise coupled to the bar, E², so that the movement of the disks, D, D', toward and from it, are simultaneous.

Means of transmitting rotation from the shaft, $d$, $d'$, to the wheels of the vehicle, are as follows: Adjacent to the shaft, $d$, a studshaft, $d^4$, is journaled in the frame, A, the shaft, $d$, and $d^4$, being coupled by gear wheels, $d^5$, $d^6$. Shafts, $d^4$, and $d'$, are connected to the wheels of the vehicle, not shown, by sprocket chains, G, and G'.

The operation of the device is as follows: In Fig. 1 the parts are shown in the inoperative position. When it is desired to start the machine, the pinions, B', B², are brought to the proper relative position to transmit the rotation to the driven disks in the direction desired, and at the speed desired, and then the disks, D, D', are brought into contact with the driving pinion by movement of the lever, $b^5$. When it is desired to change the relative positions of the driving pinion and the driven disks, either for the purpose of changing the direction, or the rate of speed, the driven disks are carried away from the driving pinions by the movement of the lever, $b^5$, and its connecting parts, and then the proper movement of the shaft, B, is effected by means of lever, $E^5$.

What I claim is:

1. In a power transmission device the combination of a longitudinal driving shaft, transverse driven shafts upon opposite sides of the driving shaft, means for shifting the driving shaft longitudinally, opposed friction disks splined upon the driven shafts, said disks having in them a series of concentric L-shaped grooves, the inner face of each groove being longer than the outer face thereof, a friction pinion upon the driving shaft having a beveled periphery and adapted to contact with the longer faces and to rotate out of contact with the shorter faces of the L-shaped grooves, and means for reciprocating the friction disks toward and from the friction pinion.

2. In a power transmission device the combination of a longitudinal driving shaft, driving pinions secured upon the shaft, transverse driven shafts upon the opposite sides of the driving shaft, friction disks upon the driven shafts, collars mounted upon the driven shafts, sleeves surrounding the collars, and having converging slots, pins in the collars engaging the converging slots, and means for rotating the sleeves to effect the reciprocation of the friction disks upon the driving shafts.

CLARENCE E. PATTON.

Witnesses:
J. M. CUSHING,
WALTER F. MURRAY.

It is hereby certified that Letters Patent No. 978,778, granted December 13, 1910, upon the application of Clarence E. Patton, of Cincinnati, Ohio, for an improvement in "Devices for Transmission of Power by Friction," were erroneously issued to the inventor, said Patton, whereas said Letters Patent should have been issued to *The Acorn Motor Car Company, of Cincinnati, Ohio, a corporation of Ohio*, said company being owner of the entire interest as shown by the records of assignments in this office; and that the said Letters Patent should be read with this correction therein that the same may conform to the record of the case in the Patent Office.

Signed and sealed this 31st day of January, A. D., 1911.

[SEAL.]  C. C. BILLINGS,
*Acting Commissioner of Patents.*